3,139,157
DISC BRAKES

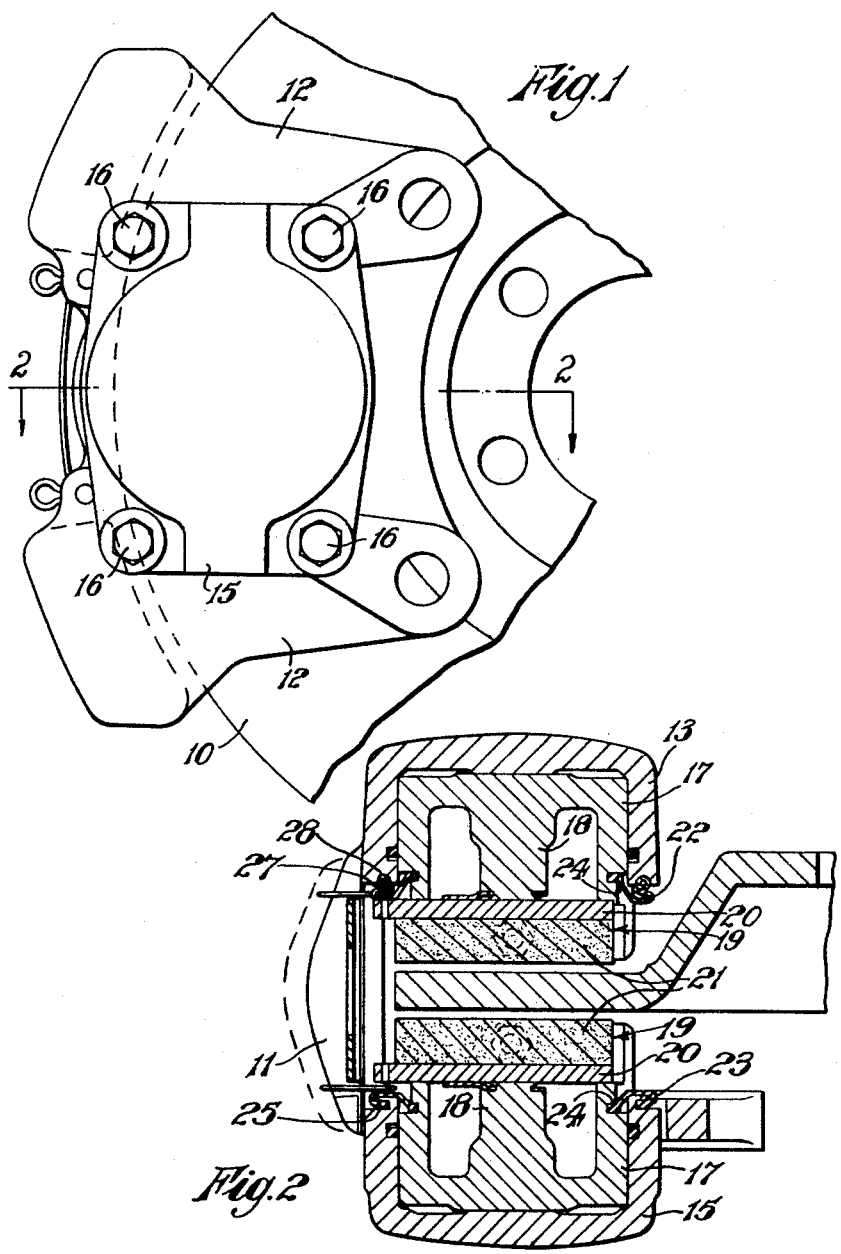

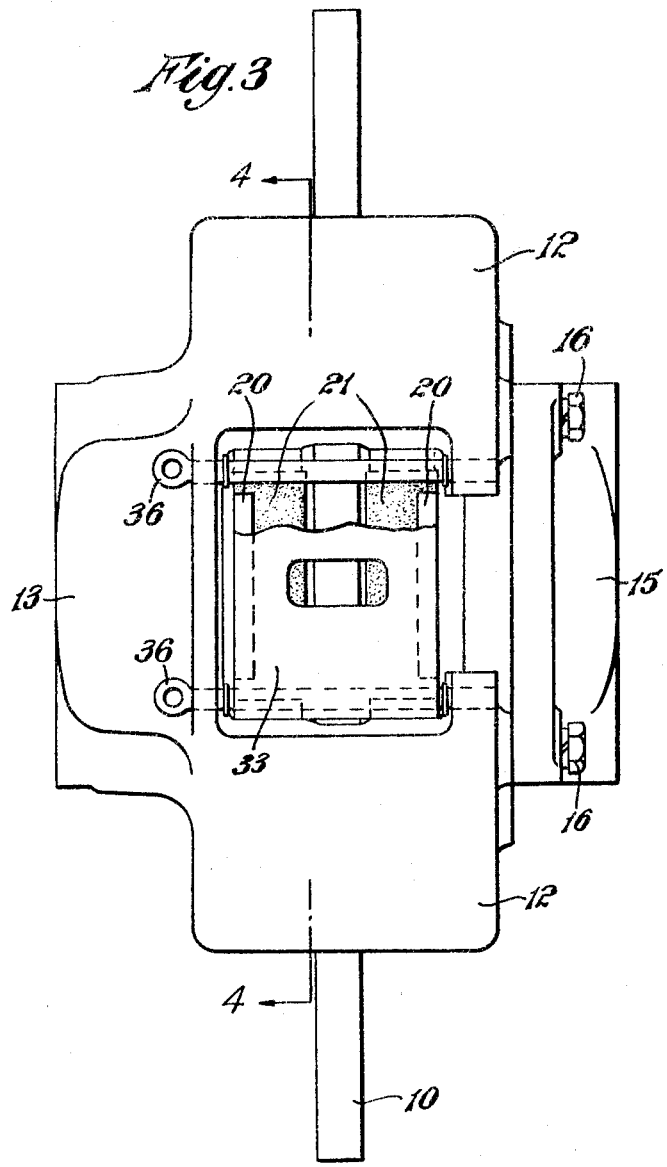

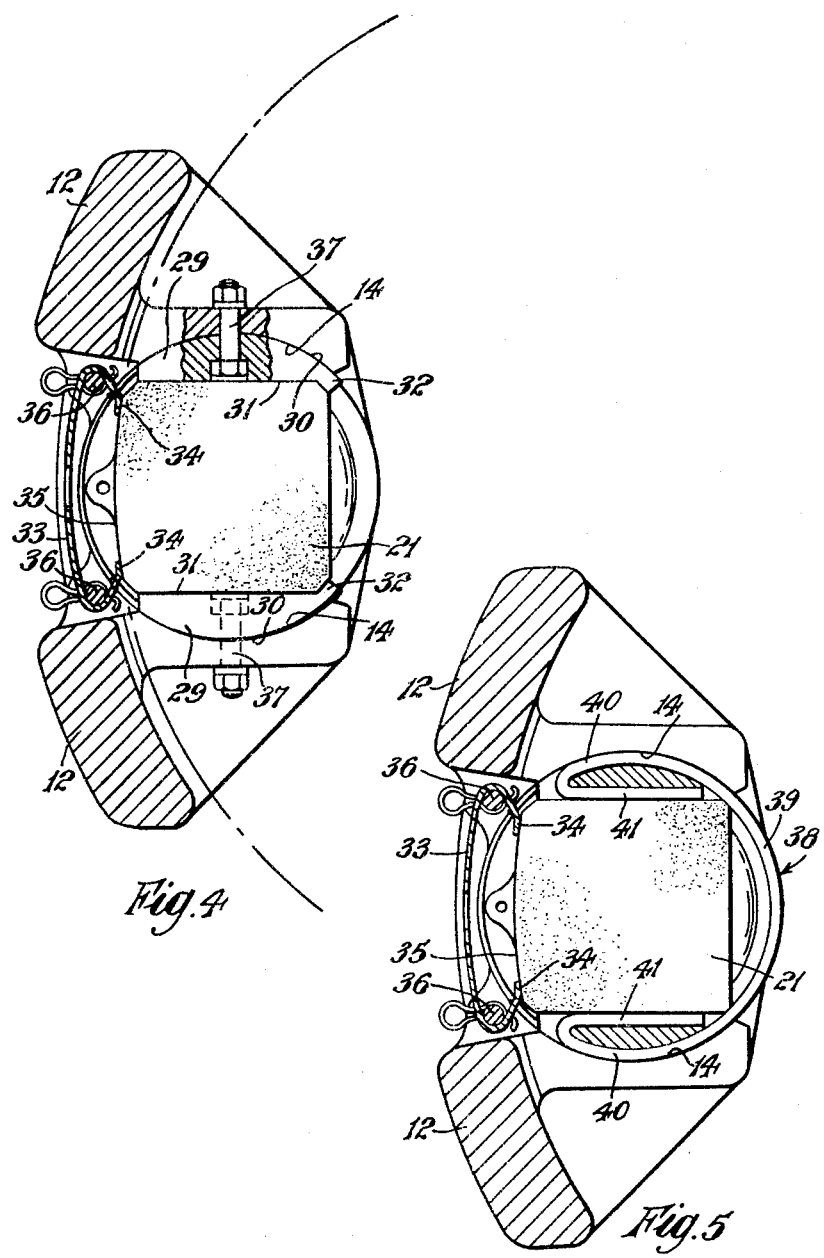

Harold Hodkinson, Finham, near Coventry, England, assignor to Dunlop Rubber Company Limited, London, England, a British company
Filed Dec. 19, 1962, Ser. No. 245,712
Claims priority, application Great Britain Dec. 21, 1961
15 Claims. (Cl. 188—73)

This invention relates to disc brakes and more particularly relates to improvements in disc brakes of the kind comprising a caliper-type housing, friction pad assemblies supported by the housing on both sides of the disc for axial movement into frictional engagement with the disc and fluid-pressure mechanisms associated with the housing on both sides of the disc for effecting said engagement.

The object of the present invention is to provide an improved brake of this kind.

According to the present invention a disc brake of the kind described wherein the torque-taking edges of the friction elements are each supported on and guided by a detachable member having a plane surface abutting said edge of the friction elements and an arcuate surface which is located against a cylindrical surface of the housing.

The members are preferably made of or treated with a material which inhibits corrosion. They can also be arranged to prevent squeal and act as heat insulators.

The present invention is illustrated by way of example in the accompanying drawings of which:

FIGURE 1 is a side elevation of a caliper-type disc brake;

FIGURE 2 is a sectional end elevation of the brake shown in FIGURE 1 taken on line 2—2 of FIG. 1;

FIGURE 3 is a plan view of the brake shown in FIGURE 1;

FIGURE 4 is a sectional side elevation of the brake taken on line 4—4 of FIG. 3 showing one embodiment of the present invention;

FIGURE 5 is a sectional side elevation of the brake showing a second embodiment of the present invention.

In one embodiment of the present invention a disc brake comprises an annular rotatable disc 10, a non-rotatable caliper-type housing 11 having two circumferentially spaced limbs 12 straddling a periphery of the disc 10 and as shown in FIG. 3 connected together on one side of the disc 10 by a cylinder 13 formed integrally therewith. The cylinder 13 is initially internally machined by a boring tool which advances from the opposite side of the housing 10 and, in machining the cylinder 13 also machines the limbs 12 at locations adjacent the disc 10 to form part-circular apertures 14 (FIGURE 4) on each side of the disc.

The limbs 12 of the caliper-type housing 11 are connected together on the opposite side of the disc 10 by a cylinder 15 which is formed and machined separately and is then secured to the associated caliper limbs 12 by a plurality of bolts 16.

A skirted piston 17 fluid-tightly slidable in each cylinder 13, 15 is provided with a central stem 18 adapted to abut an associated friction element 19 which comprises a backing plate 20 to which is secured a pad 21 of friction material.

Each piston 17 is provided with an annular dust cap 22, 23 which extends between a groove 24 formed in the outer periphery of the skirt of the pistons 17 and the end of the cylinders 13, 15 to prevent the entry of moisture and foreign matter. In the case of the detachable cylinder 15 the outer edge 25 of the dust cap 22 is fitted in a groove formed in the outer periphery of the cylinder 15 whereas in the case of the integral cylinder 13 the outer periphery 27 of the dust cap 22 is fitted in tension in a retainer 28 which may be bolted, bonded or pressed on to the innermost end of the cylinder 13.

The friction elements 19 are substantially square in shape and are located adjacent the opposite braking surfaces of the disc 10 between the limbs 12 of the housing 11. The sides of said limbs 12 facing one another have been machined into part-circular concave shaped apertures 14 and located in each of these apertures 14 is a member 29 of plano-convex shape having a part-cylindrical face 30 fitted within said aperture 14 and a plane face 31 which extends parallel to a radius of the disc 10 which passes through the centre line of the cylinders 13, 15. The friction elements 19 are each axially slidable between the plane faces 31 of a pair of said members 29 and the radially inner end 32 of said members 29 is turned towards one another to form a step to prevent the friction elements 19 from moving radially inwardly.

Radially outwards movement of the friction elements 19 from between the limbs 12 of the housing 11 is prevented by a springy retaining member 33 the ends 34 of which abut and bear down on the radially outer faces 35 of the friction elements. The retaining member 33 is held in place by a pair of axially extending bolts 36 which pass through the housing 11 adjacent the outer periphery of the disc 10. Alternatively the bolts 36 can be arranged to engage directly on the radial outer face 35 of the friction elements 19.

The segmental torque-taking members 29 may be secured to the limbs 12 of the housing 11 by bolts 37, alternatively they may be secured to the housing by rivets or the like or by bonding or a suitable adhesive.

One of the advantages of this form of construction is that the torque-taking members 29 may be suitably treated or made of a suitable material, which avoids corrosion. Thus they may be cadmium plated or vitreous enamelled or subjected to some other similar process or alternatively they can be made of some inert material such as fibre glass or ceramic which inhibits galvanic corrosion due to electrolytic action between the housing and metallic or other like inclusions in the friction material.

This is very much cheaper than treating the entire caliper. In addition the members serve as dampers to prevent or reduce squeal when the brakes are applied and furthermore, by choice of a suitable material, they can prevent or reduce the transmission of heat from the friction elements to the caliper.

If necessary a thin lining of heat-resistant rubber or rubber-like material may be fitted between the part-cylindrical face 30 of each member 29 and the associated face of the aperture 14 which additionally serves to reduce squeal and noise.

In a further embodiment of the invention the two torque-taking members 29, one on each side of the friction element 19, may be combined to form a single member 38 of substantially part-cylindrical shape, the median portion 39 spanning the radially-inner end of said friction element and the part-circular side portions 40 fitting in the apertures 14 in the limbs 12. The side portions 40 are doubled back on themselves to form flat torque-taking abutments 41 for the friction elements 19. The space between the part-circular side portions 40 and the flat abutments 41 may be filled with a squeal damping or heat-insulating material such as a hard rubber.

Having now described my invention, what I claim is:

1. A disc brake comprising a rotatable disc, a non-rotatable caliper-type housing straddling a periphery of said disc, a friction element associated with the housing and movable axially therein to make frictional engagement with the disc, a mechanism associated with the housing for moving the friction element towards the disc, the housing having a cylindrical axially directed bore through which the friction element is movable by said mechanism to engage the disc and a pair of detachable inserts located within said bore to slidably engage opposite side surfaces of the friction element to form a guide therefor, said detachable inserts being formed, at least on their surfaces engageable with the friction element, from material which is not subject to corrosion.

2. A disc brake according to claim 1 wherein said detachable members are made of sintered metal covered with vitreous enamel.

3. A disc brake comprising a rotatable disc, a non-rotatable caliper-type housing straddling a portion of a periphery of said disc and having arcuate surfaces spaced on opposite sides of a radius of said disc with a common axis on said radius to form a passage to the side of said disc, a friction element movable in said passage to and from frictional engagement with said disc and having a surface on each side of and spaced from said radius and between said radius and one of said arcuate surfaces, means to move said friction element to and from said disc, and a pair of detachable inserts located within the space between said surface of said friction element and the adjacent arcuate surface of said housing, one of said inserts on each side of said friction element, and having a guide and stress receiving surface adjacent one of the surfaces of said friction element and a surface supported by said arcuate surface, said surface of each of said inserts adjoining said friction element being of material not subject to corrosion.

4. The disc brake of claim 3 in which the adjoining surfaces of one of said inserts and of said friction element are plane and parallel to the adjoining surfaces of the other insert and friction element.

5. The disc brake of claim 3 in which said spaced arcuate surfaces enable said friction element to be withdrawn radially and in which said housing has a removable means to hold said friction element from removal from said passage.

6. The disc brake of claim 3 in which said housing has a pair of said arcuate surfaces on each side of said disc and a detachable insert adjacent each of said arcuate surfaces and in which said brake has a friction element on each side of said disc.

7. A disc brake according to claim 1 wherein said detachable members are treated with a material which inhibits corrosion.

8. A disc brake according to claim 1 wherein said detachable members are made of sintered metal which is covered by cadmium.

9. A disc brake according to claim 1 wherein said detachable members are made of ceramic material.

10. A disc brake according to claim 1 wherein a lining of heat-resistant rubber is inserted between the arcuate face of each detachable member and the associated cylindrical surface of the housing.

11. A disc brake according to claim 1 wherein the detachable members are provided adjacent their radially inner ends with projections which extend towards each other to abut the radially inner edge of each friction element.

12. A disc brake according to claim 1 wherein the radially inner ends of the detachable members are integrated by a part-cylindrical median portion which spans the radially inner edge of said friction elements.

13. A disc brake according to claim 1 comprising detachable means which comprises a springy retaining member and a pair of axially extending bolts, said retaining member being adapted to abut and bear down on the radially outer faces of the friction elements to hold said friction elements from movement in a radially outward direction.

14. A disc brake according to claim 11 comprising at least one axially extending bolt on said housing to abut the radially outer faces of the friction elements to prevent radially outward movement of said friction elements.

15. A disc brake according to claim 1 wherein the caliper-type housing is provided with a cylinder formed integrally therewith on one side of the disc and a cylinder detachably secured to the other side of the housing.

References Cited in the file of this patent

UNITED STATES PATENTS

| | | |
|---|---|---|
| 1,254,344 | Murphy | Jan. 22, 1918 |
| 2,310,757 | Wagner | Feb. 9, 1943 |
| 2,801,714 | Dotto | Aug. 6, 1957 |

FOREIGN PATENTS

| | | |
|---|---|---|
| 1,239,953 | France | July 25, 1960 |
| 1,244,756 | France | Sept. 19, 1960 |